(12) United States Patent
Shah et al.

(10) Patent No.: US 10,154,368 B1
(45) Date of Patent: Dec. 11, 2018

(54) SYSTEMS AND METHODS FOR PROVIDING SYSTEM-ACQUISITION PARAMETERS ON STANDARDIZED FREQUENCIES

(75) Inventors: Maulik K. Shah, Overland Park, KS (US); Sachin R. Vargantwar, Macon, GA (US); Jasinder P. Singh, Olathe, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1673 days.

(21) Appl. No.: 13/584,400

(22) Filed: Aug. 13, 2012

(51) Int. Cl.
*H04W 4/02* (2018.01)
*H04W 64/00* (2009.01)

(52) U.S. Cl.
CPC ............. *H04W 4/02* (2013.01); *H04W 64/00* (2013.01)

(58) Field of Classification Search
CPC . H04W 72/0453; H04W 16/14; H04W 24/10; H04W 4/008; H04W 4/206; H04W 52/146; H04W 52/325; H04W 72/04; H04W 72/042; H04W 72/1273; H04W 12/06; H04W 16/18; H04W 16/26; H04W 16/32; H04W 24/04; H04W 36/0061; H04W 36/0088

USPC .......... 370/335, 342, 328, 329, 441; 455/62, 455/411, 433, 3.03, 442, 436, 439, 434
See application file for complete search history.

(56) References Cited

U.S. PATENT DOCUMENTS

| | | | |
|---|---|---|---|
| 8,249,498 B1* | 8/2012 | Pulugurta | ..................... 455/3.03 |
| 2001/0055328 A1* | 12/2001 | Dowling | ............... H04W 48/16 375/130 |
| 2008/0096527 A1* | 4/2008 | Lamba et al. | ................. 455/411 |
| 2009/0285159 A1* | 11/2009 | Rezaiifar | .......... H04W 72/0486 370/328 |
| 2013/0143502 A1* | 6/2013 | Kazmi et al. | ................... 455/62 |

* cited by examiner

*Primary Examiner* — Natasha W Cosme

(57) ABSTRACT

Disclosed are systems and methods for providing system-acquisition parameters on standardized frequencies. One embodiment takes the form of a method for assisting mobile devices with system acquisition. The method includes, in each of two or more wireless coverage areas, broadcasting from a radio access network (RAN) on each of one or more predefined frequencies one or more sets of one or more system-acquisition parameters. The method also includes configuring one or more mobile devices with logic executable for, in response to detecting a triggering event, retrieving at least one of the sets of system-acquisition parameters on at least one of the predefined frequencies, and then using at least one retrieved set of system-acquisition parameters to attempt to acquire system connectivity.

12 Claims, 5 Drawing Sheets

SYSTEMS AND METHODS FOR PROVIDING SYSTEM-ACQUISITION PARAMETERS ON STANDARDIZED FREQUENCIES

BACKGROUND

1. Technical Field

The present disclosure relates to wireless communications and, more particularly, to system selection and acquisition in wireless communication systems.

2. Description of Related Art

Many people use mobile devices such as cellular phones, smartphones, tablet computers, and personal digital assistants to communicate with cellular wireless networks, which typically implement a radio access network (RAN) in order to provide communication services such as voice, text messaging, and packet-data communication to these mobile devices. The mobile devices and networks typically communicate with each other over a radio-frequency (RF) air interface according to a wireless protocol such as 1×RTT CDMA, EV-DO, GSM, and/or one or more others.

Mobile devices typically conduct these wireless communications with one or more base-station systems of a given RAN, where each such base-station system may send communications to and receive communications from mobile devices over the air interface and, together with additional network infrastructure, may provide connectivity with one or more transport networks such as the public switched telephone network (PSTN) and/or the Internet, as examples. In such an arrangement, mobile devices are typically able to communicate via the base-station system(s) with one or more remote endpoints such as other mobile devices or other nodes that are accessible via the one or more transport networks.

When mobile devices are powered on, reset, lose a signal, and/or for some other reason are seeking a connection to a RAN, they typically scan for networks with reference to an internally stored data table known as a preferred roaming list (PRL). For a given geographic region, the PRL may list wireless networks in a priority order, and may identify each network by data such as a system identification code (SID), network identification code (NID), and carrier frequency, perhaps among other information. Each base-station system in the region may belong to a particular RAN and thus have an associated SID and NID, and may broadcast that SID and NID on one or more air-interface control channels so that mobile devices scanning for networks may detect the SID and NID and determine by reference to their PRL whether to connect (or at least attempt to connect) with a base-station system of that RAN.

In practice, a mobile device may scan for coverage in descending order of network preference as indicated by the mobile device's PRL until the mobile device successfully detects a base-station system broadcasting a SID-and-NID combination that is listed in the mobile device's PRL, and then successfully acquires that system. The mobile device may conduct system acquisition at least in part by registering to receive wireless service from that base-station system and its associated network infrastructure. For instance, the mobile device may transmit a registration-request message to the base-station system, perhaps triggering an update of a record in the network to indicate that the mobile device is operating within the coverage of that particular base-station system, and the mobile device may receive a registration-response message, acknowledging the registration.

Overview

As described, mobile devices typically conduct system acquisition at least in part by scanning their respective PRLs for data to use in attempting to detect and acquire connectivity to a system. More particularly, mobile devices typically scan sequentially through some number of carrier frequencies listed in a part of the PRL that is typically referred to as the acquisition table. In a typical arrangement, the acquisition table is arranged such that it has some number of rows of data, where each row lists a particular carrier frequency on which the mobile device should check for a network to which to connect.

Recent times have witnessed a proliferation in the numbers of cellular wireless networks and spectrum bands currently in use and, accordingly, typical acquisition tables of typical PRLs have grown in size, and thus the average amount of time that mobile devices spend stepping through row after row, scanning carrier frequency after carrier frequency, has increased commensurately. This is exacerbated in cases where a mobile device is attempting system acquisition without first being able to ascertain the device's current geographic location, such as when a mobile device is powered on or taken out of "airplane mode" after a flight from one geographic location to another. Indeed, in such cases, the mobile device may have to step through many (perhaps on the order of one hundred) rows of its acquisition table before successfully connecting to a RAN. This process is wasteful of, at a minimum, time and battery power, and can have only negative effects on the overall user experience.

To address these issues as well as others, presently disclosed are systems and methods for providing system-acquisition parameters on standardized frequencies. One embodiment takes the form of a method for assisting mobile devices with system acquisition. The method includes, in each of two or more wireless coverage areas, broadcasting from a RAN on each of one or more predefined frequencies one or more sets of one or more system-acquisition parameters. The method also includes configuring one or more mobile devices with logic executable for, in response to detecting a triggering event, retrieving at least one of the sets of system-acquisition parameters on at least one of the predefined frequencies, and then using at least one retrieved set of such parameters to attempt to acquire system connectivity. Another embodiment takes the form of a system comprising a RAN and one or more mobile devices, where both the RAN and the mobile devices are configured to operate in this manner.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions to realize the carrying out of one or more of the functions described herein.

1. Example Architecture a. Example Communication System

Figure 1:
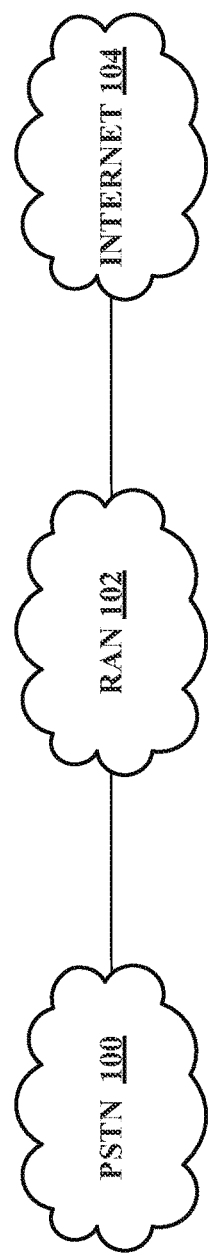
FIG. 1 is a simplified block diagram of an example of a communication system.

As noted above, FIG. 1 depicts a communication system in which the embodiments of the present methods and systems could be implemented. The system includes a RAN 102 that functions to provide served mobile devices with communication service, such as access to one or more transport networks for instance. In FIG. 1, the RAN 102 is configured to connect to the Public Switched Telephone Network (PSTN) 100 (and/or one or more other circuit-switched networks) and the Internet 104 (and/or one or more other packet-switched networks). In other examples, the RAN 102 may be configured to connect to different networks. In addition to the example RAN 102 described herein, a suitable RAN could take other forms as well, ranging in degree of complexity and scope of operation.

The PSTN 100 may consist of telephone lines, microwave-transmission technology, cellular networks, satellites, and fiber-optic cables, as examples. In some embodiments, the PSTN 100 may connect to the Internet 104 or may connect to both the Internet 104 and the RAN 102.

The RAN 102 (e.g., one or more entities and/or devices making up all or part of the RAN 102) may include a wireless-communication interface, a processor, and data storage. The wireless-communication interface may comprise one or more base stations with antenna arrangements that radiate to define various coverage areas. A processor may be utilized at the base station, a base station controller, and/or at one or more other RAN entities.

The Internet 104 represents a worldwide system of computer networks that use the standard Internet Protocol (IP) suite, though in some embodiments the Internet 104 may take the form instead or in addition of one or more packet-switched data networks other than the network generally referred to as the Internet. The Internet 104 may provide mobile devices with the ability to communicate with other devices and networks via electronic, wireless, and/or optical networking technologies. The Internet 104 may provide users with services like Voice over IP (VoIP) and social-networking resources, as examples.

Figure 2:
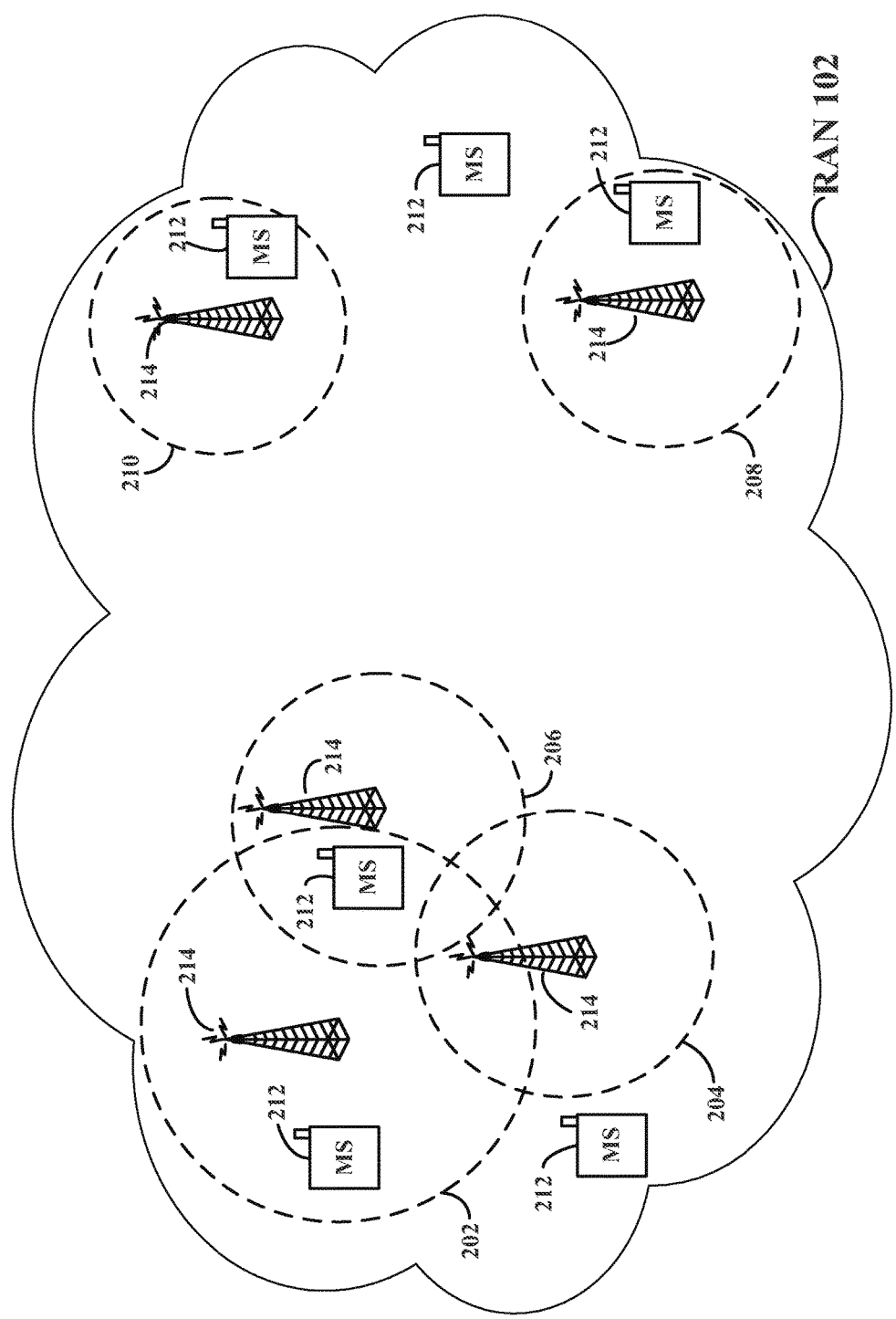
FIG. 2 is a simplified block diagram of an example of a radio access network (RAN)

FIG. 2 is a simplified diagram of an example RAN, in particular the RAN 102 depicted in FIG. 1. As shown in the example arrangement that is depicted in FIG. 2, the RAN 102 includes one or more base stations 214, each providing various coverage areas. Mobile devices 212 operate within the RAN 102, with some mobile devices 212 operating within the coverage areas of one or more base stations 214.

Each base station 214 may include one or more antenna arrangements and associated equipment for radiating to provide one or more wireless coverage areas in which mobile devices may operate. A given coverage area in the RAN may be located geographically close to (e.g., neighboring) one or more other coverage areas, while being located geographically further from (e.g., not neighboring) one or more other coverage areas. As one example, FIG. 2 depicts representative coverage areas 202-210, where coverage areas 202-206 are geographically located in one portion of the RAN 102, and may be arranged in a neighboring and/or overlapping manner in order to facilitate handoffs of mobile devices between and among the coverage areas in that group. Coverage area 208 is located at a significant distance away from the grouping (e.g., too far to accommodate a direct handoff), and coverage area 210 is located a significant distance away both from the group of coverage areas 202-206 and from the coverage area 208.

Further, shown operating within the coverage of the RAN 102 is a number of example mobile devices 212. The air-interface communications between the network and various mobile devices in each coverage area may be conducted according to one or more air-interface protocols, examples of which include CDMA (e.g., 1×RTT or 1×EV-DO), iDEN, WiMAX, LTE, GSM, HSDPA, and others now known or later developed. Communications in the direction from the RAN 102 to mobile devices define a "forward link," while those in the direction from mobile devices to the RAN 102 define a "reverse link."

In each coverage area, the RAN 102 may provide service on one or more carrier frequencies. In at least one embodiment, on a given carrier frequency, the forward link defines a pilot channel on which the RAN 102 broadcasts a pilot signal for use by mobile devices to detect and evaluate coverage (with each pilot signal including or embodying an identifier of the coverage area), a paging channel on which the RAN 102 pages mobile devices, and one or more traffic channels on which the RAN 102 transmits bearer data to mobile devices that are actively engaged in calls (e.g., voice calls or data communications). The reverse link, on the other hand, may define an access channel on which mobile devices may send requests to initiate traffic connections for calls, and one or more traffic channels on which mobile devices may transmit bearer traffic to the RAN 102. And certainly other configurations could be used.

b. Example Mobile Device

Figure 3:
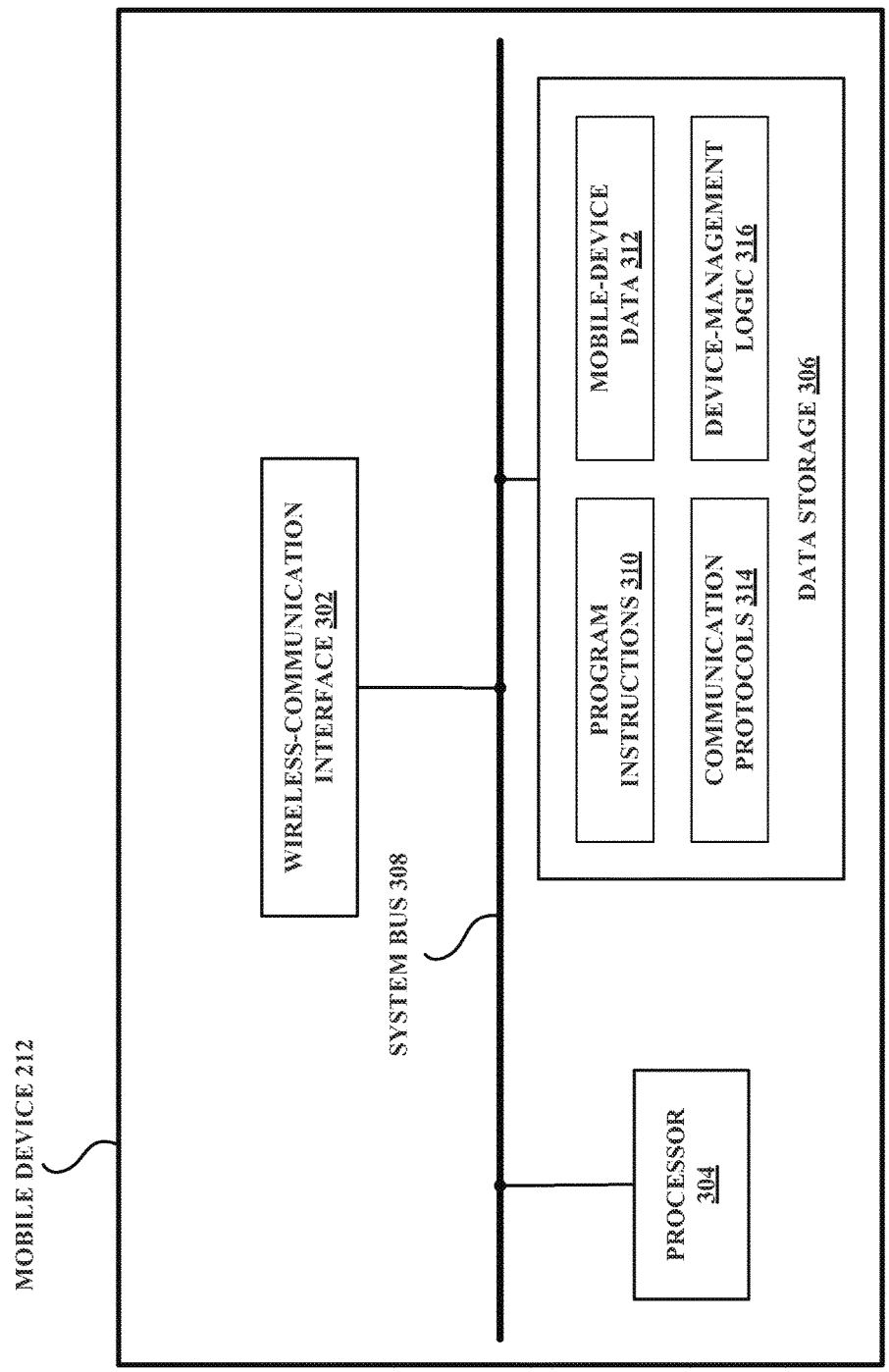
FIG. 3 is a simplified block diagram of an example of a mobile device.

FIG. 3 is a simplified block diagram of an example mobile device that may be used in accordance with one or more embodiments. In particular, FIG. 3 depicts mobile device 212 as including a wireless-communication interface 302, a processor 304, and data storage 306, all of which may be communicatively linked by a system bus 308. In addition, mobile device 212 may include additional features such as a global positioning system (GPS) receiver, camera, and/or battery power, etc.

Wireless-communication interface 302 may be or include any combination of hardware and/or software that mobile device 212 uses to communicate over an RF air interface with a RAN, and may comprise a chipset suitable for CDMA communication (and/or one or more other chipsets suitable for communication according to one or more other protocols), and perhaps an antenna.

Processor 304 may comprise multiple (e.g., parallel) processors, such as a general purpose microprocessor and/or a discrete digital signal processor. Data storage 306 may take various forms, in one or more parts, such as a non-volatile storage block and/or a removable storage medium. Data storage 306 may store program instructions 310, mobile-device data 312, communication protocols 314, and device management logic 316. Program instructions 310 may be executable by processor 304 to carry out various mobile-device functions described herein. Mobile-device data 312 may include a PRL, and may also include any other types of data.

Communication protocols 314 may be useful to receive data from and send data to one or more network entities, and may include any protocols mentioned herein, any proprietary protocols, and/or any other protocols. Compatible protocols may be stored in other entities in communication with mobile device 212. Device management logic 316 may be used to manage aspects of mobile device 212 such as memory and file management.

c. Exemplary PRL

Figure 4:
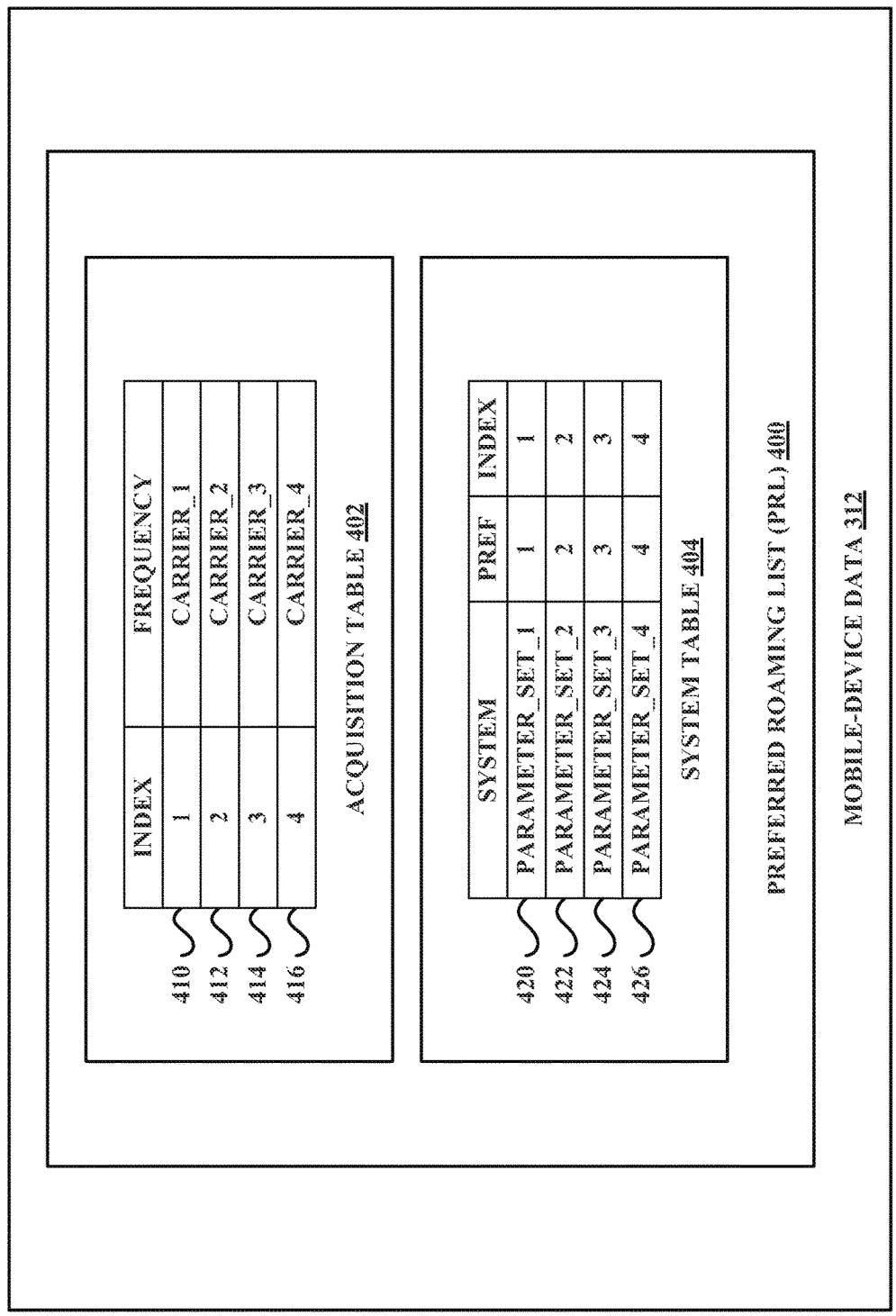
FIG. 4 is a simplified block diagram of an example of a preferred roaming list (PRL)

FIG. 4 depicts a PRL that may be used in accordance with one or more embodiments. In particular, FIG. 4 illustrates a PRL 400 that may be stored as mobile-device data 312. PRL 400 comprises an acquisition table 402 and a system table 404. It should be understood, however, that PRL 400 could take other forms, and store other types of data as well; furthermore, the various parts of PRL 400 could be stored in a single storage medium or among separate storage media. The acquisition table 402 may take the form of or include an indexed list of frequencies on which a mobile device may search for particular systems. A given PRL may be configured in various ways, including being organized by geographical region, and perhaps being organized in descending order of priority within each grouping by geographical region. And certainly other manners of organizing PRLs could be used in various contexts.

In this example, acquisition table 402 has four rows, each containing an index for that particular row and an RF carrier frequency on which mobile device 212 may search for a communication system to which to connect. As shown in FIG. 4, row 410 contains the index "1" and an RE channel represented as "CARRIER_1," indicating this is an RE frequency on which a "carrier 1" operates. "CARRIER_1" is a representation the entries in the acquisition table 402 may contain numerical representations of carrier frequencies.

Row 412 of the acquisition table 402 contains index "2" and an RE frequency "CARRIER_2," on which a "carrier 2," separate and distinct from carrier 1, operates. Similarly, rows 414 and 416 of acquisition table 402 list index "3" paired with a frequency for a "carrier 3" designated "CARRIER_3" and index "4" paired with a frequency for a "carrier 4" designated "CARRIER_4," respectively. It is noted that an actual acquisition table in an actual mobile device would have many more entries than are illustrated in acquisition table 402 of FIG. 4, as FIG. 4 is provided by way of example.

Depicted below acquisition table 402 in FIG. 4 is system table 404. Note that the indexes listed in rows 410-416 of acquisition table 402 match the indexes listed in rows 420-426 of system table 404, and that each row 420-426 of system table 402 contains system-identifying data (under "SYSTEM"), a preference indicator (under "PREF"), and the aforementioned indexes (under "INDEX"). Other data may also be included in a system table.

With respect to rows 420 and 422, system-access data is given for carrier 1 and carrier 2, respectively. Again, the matching index "1" in rows 410 and 420 indicate that those rows pertain to carrier 1, and the matching index "2" in rows 412 and 422 indicate that those rows pertain to carrier 2. Carrier 1 is listed as the most preferred communication system on PRL 402 of mobile device 212, which is indicated by the "1" preference value in row 420.

The "SYSTEM" columns of rows 420-422 list "PARAMETER_SET_1" and "PARAMETER_SET_2," respectively, indicating that the "SYSTEM" entry in row 420 contains a set of system-acquisition parameters for carrier 1, and that the "SYSTEM" entry in row 422 contains a set of system-acquisition parameters for carrier 2. Using CDMA by way of example, each CDMA system is uniquely identified by one or more sets of one or more system-acquisition parameters, which may include the combination of SID, NID, and Radio Frequency. It can be appreciated from FIG. 4 that, taken together, acquisition table 402 and system table 404 provide this combination for carriers 1-4. Moreover, CDMA base stations typically broadcast their respective system-acquisition parameters in system overhead messages. Thus, once mobile device 212 detects a carrier listed on its PRL by searching the frequency listed in acquisition table 402, the mobile device 212 can verify the identity of the network by matching the system-acquisition parameters broadcast on that frequency to the system-acquisition parameters in the system table 404.

2. Example Method

Figure 5:
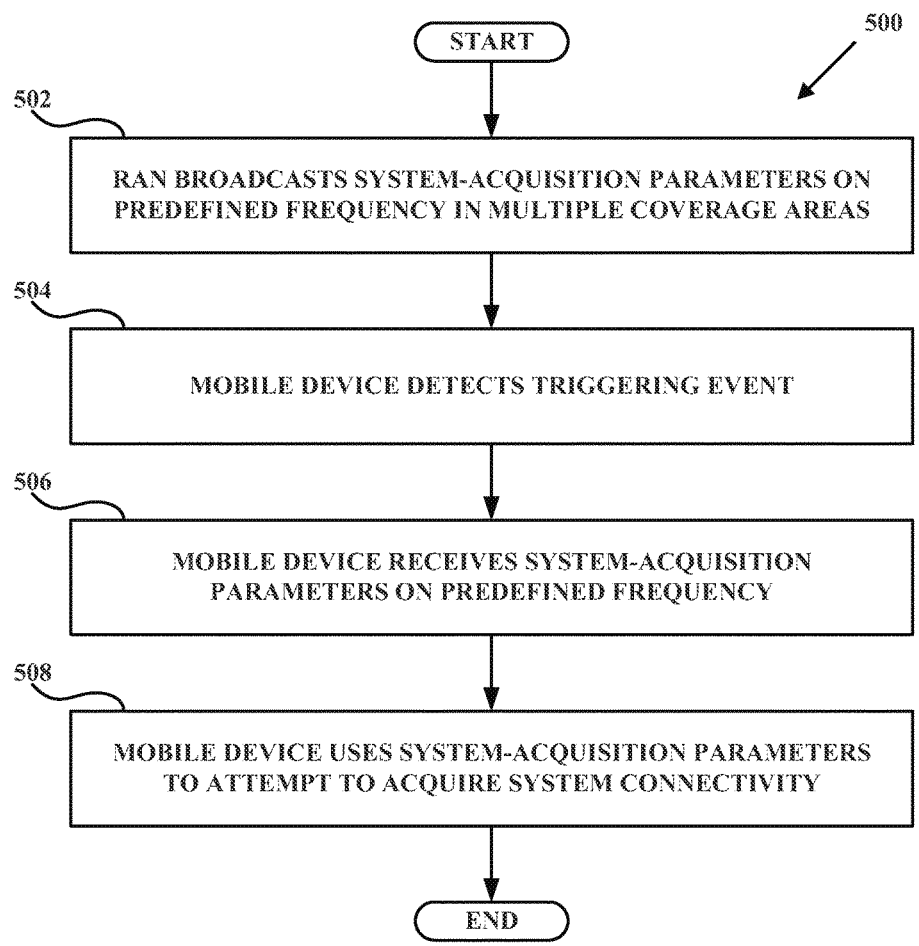
FIG. 5 is a flowchart of an example of a method in accordance with at least one embodiment.

FIG. 5 is a flow chart of a method, in accordance with an embodiment. As shown in FIG. 5, a method 500 begins at step 502 with a RAN broadcasting system-acquisition parameters on a predefined frequency in multiple coverage areas. In one or more embodiments, the RAN broadcasts one or more sets of system-acquisition parameters on multiple predefined frequencies. In at least one embodiment, the RAIN broadcasts system-acquisition parameters in each wireless coverage area in a set of wireless coverage areas that each overlap at least partially with a location of at least one transportation station. Examples of transportation stations include airports, shipyards, train stations, boat ports, and bus stations.

The RAN 102 may broadcast one or more sets of system-acquisition parameters in coverage areas 202, 208, and 210 if those are the only coverage areas that contain at least one airport, just as a simple example. One or more of the broadcast system-acquisition parameters could be or include one or more alphanumeric codes, one or more frequencies, and/or one or more other representations of data that facilitate system acquisition. In at least one embodiment, at least one set of system-acquisition parameters includes a. SID. Further, in at least one embodiment, at least one set of system-acquisition parameters includes both a SID and a NID. And certainly many other examples are possible as well.

The predefined frequency may be one that the RAN would not be using for any other purpose. In some embodiments, a relatively low frequency such as 30 kHz may be used, to offer but one example. In embodiments in which the RAN broadcasts one or more sets of system-acquisition parameters on each frequency in a plurality of predefined frequencies, the frequencies may be arranged by a certain interval or within a specified range, such as 30 kHz, 60 kHz, and 90 kHz, again as but one example.

At step 504, a mobile device 212 may detect a triggering event. In an embodiment, the mobile device may acquire a signal after the device had lost service, perhaps due to being out of range of the network's coverage. For example, a user may lose service or turn off a mobile device while flying on an airplane and, upon arrival at his or her destination, may power on the mobile device, perhaps to make a cellular call. In such an example, the powering on of the device could be the triggering event, as could the mobile device detecting a signal subsequent to being powered on. Referring back to FIG. 2, a mobile device 212 may travel from coverage area 206 to coverage area 210 in a powered-off state, or perhaps in an airplane-mode state, and then detect and/or experience the triggering event of step 504 after arriving in coverage area 210. In some embodiments, the detecting of the triggering event may require that the mobile device be, for example, without service for at least a predefined amount of time, such that momentary losses of service would not, in those embodiments, be triggering events with respect to step 504.

In at least one embodiment, the triggering event is the mobile device 212 scanning (or having scanned) through a predefined number (e.g., 4, 10, or 50) of channels (i.e., carrier frequencies listed in respective rows) in the acquisition table in the PRL. In such embodiments, the mobile device 212 may be arranged to initially scan the acquisition table, but in cases where suitable system-acquisition parameters are not detected after a certain number of attempts, the mobile device may continue on to step 506 rather than using additional time and battery power to continue stepping through the acquisition table.

At step 506, the mobile device 212 receives a set of system-acquisition parameters on the predefined frequency. To do so, the mobile device 212 may simply tune to the predefined frequency and then receive the set of system-acquisition parameters. In instances where the RAN broadcasts one or more sets of system-acquisition parameters on more than one predefined frequency, a given mobile device 212 may check each predefined frequency in turn. For example, the mobile device 212 may check 30 kHz, then 60 kHz, and then 90 kHz. Upon receipt, the mobile device 212 may store the received set of system-acquisition parameters in data storage 306 for ready access by the processor 304.

At step 508, the mobile device 212 uses the system-acquisition parameters to attempt to acquire system connectivity. In at least one embodiment, the received set of system-acquisition parameters includes a carrier frequency. In such a case, the mobile device 212 may simply tune to that carrier frequency and search for whatever pilot signal and/or other acquisition-related information may be available on that frequency. In some embodiments, the received set of system-acquisition parameters includes a frequency and additional data (e.g., a SID and NID) that the mobile device should expect to detect upon tuning to that frequency. In such cases, the mobile device may respond to receiving such a set of system-acquisition parameters on the (predefined frequency by tuning to the carrier frequency indicated in the received set of system-acquisition parameters and then seeking to detect the additional data on that carrier frequency. And certainly other variations could be used as well without departing from the scope and spirit of the present systems and methods.

While some example embodiments have been described above, those of ordinary skill in the art will appreciate that numerous changes to the described embodiments could be made without departing from the scope and spirit of the claims.

We claim:

1. A method for assisting mobile devices with system acquisition, the method comprising:
   in each wireless coverage area in a set of two or more wireless coverage areas, broadcasting from a radio access network (RAN) on each frequency in a set of one or more predefined frequencies one or more sets of one or more system-acquisition parameters; and
   configuring one or more mobile devices with logic executable for, in response to detecting a triggering event, retrieving at least one of the sets of system-acquisition parameters on at least one of the predefined frequencies, and then using at least one retrieved set of system-acquisition parameters to attempt to acquire system connectivity,
   wherein each of the one or more predefined frequencies is not used by the RAN for any purpose in each wireless coverage area of the two or more wireless coverage areas other than to carry the one or more sets of one or more system-acquisition parameters.

2. The method of claim 1, wherein each wireless coverage area in the set of wireless coverage areas overlaps at least partially with a location of at least one transportation station.

3. The method of claim 1, wherein one of the predefined frequencies is 30 kHz.

4. The method of claim 1, wherein one or more of the system-acquisition parameters is a frequency.

5. The method of claim 1, wherein one or more of the system-acquisition parameters is an alphanumeric code.

6. The method of claim 1, wherein one or more of the system-acquisition parameters is a system identification code (SID).

7. The method of claim 1, wherein one or more of the system-acquisition parameters includes both a system identification code (SID) and a network identification code (NID).

8. The method of claim 1, wherein the triggering event comprises the respective mobile device being powered on.

9. The method of claim 1, wherein the triggering event comprises the respective mobile device detecting one or the other of a wireless signal and a loss of a wireless signal.

10. The method of claim 1, wherein the triggering event comprises the respective mobile device scanning through a predefined number of channels listed in an acquisition table associated with a preferred roaming list (PRL) of the mobile device.

11. The method of claim 10, wherein the predefined number is 4.

12. A method for assisting mobile devices with system acquisition, the method comprising:
   a radio access network (RAN) broadcasting system-acquisition parameters in each of multiple coverage areas on at least one predefined frequency from which mobile devices are configured to retrieve the system-acquisition parameters when in any of the multiple coverage areas, for use by the mobile devices in attempting to acquire system connectivity,
   wherein the predefined frequency on which the RAN broadcasts the system-acquisition parameters in each of the multiple coverage areas is a frequency that the RAN does not use for any other purpose.

* * * * *